United States Patent
Dudar (10) Patent No.: US 10,513,958 B2
(45) Date of Patent: Dec. 24, 2019

(54) SYSTEMS AND METHODS FOR PARTICULATE FILTER REGENERATION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/934,268

(22) Filed: Mar. 23, 2018

(65) Prior Publication Data
US 2019/0292959 A1    Sep. 26, 2019

(51) Int. Cl.
| | | |
|---|---|---|
| F01N 3/023 | (2006.01) |
| F02D 41/02 | (2006.01) |
| F01N 13/00 | (2010.01) |
| F02M 26/06 | (2016.01) |
| F02D 41/00 | (2006.01) |
| F02M 26/05 | (2016.01) |
| F01N 3/10 | (2006.01) |

(52) U.S. Cl.
CPC ......... *F01N 3/0238* (2013.01); *F01N 3/0236* (2013.01); *F01N 13/009* (2014.06); *F02D 41/0055* (2013.01); *F02D 41/029* (2013.01); *F02M 26/05* (2016.02); *F02M 26/06* (2016.02); *F01N 3/101* (2013.01); *F02D 2200/0812* (2013.01)

(58) Field of Classification Search
CPC ...... F01N 13/009; F01N 3/023; F01N 3/0233; F01N 3/0238; F01N 3/101; F01N 3/30; F02D 2200/0812; F02D 41/0055; F02D 41/029; F02D 41/042; F02M 26/05; F02M 26/06; Y02A 50/2324; Y02A 50/2325; Y02T 10/22
See application file for complete search history.

(56) References Cited

U.S. PATENT DOCUMENTS

| | | | |
|---|---|---|---|
| 8,505,297 B2 | 8/2013 | Schaffeld et al. | |
| 8,844,272 B2* | 9/2014 | Bidner | F01N 3/30 60/295 |
| 2004/0226287 A1* | 11/2004 | Edgar | F01N 3/023 60/295 |
| 2009/0071128 A1* | 3/2009 | Gonze | F01N 3/027 60/286 |
| 2009/0183499 A1* | 7/2009 | Boorse | F01N 3/025 60/295 |
| 2011/0072793 A1* | 3/2011 | Bidner | F01N 3/0233 60/285 |
| 2011/0072797 A1* | 3/2011 | Van Nieuwstadt | F01N 3/0238 60/285 |
| 2011/0146274 A1* | 6/2011 | Shimizu | B01D 46/0005 60/611 |

* cited by examiner

*Primary Examiner* — Thai Ba Trieu
*Assistant Examiner* — Diem T Tran
(74) *Attorney, Agent, or Firm* — Geoffrey Brumbaugh; McCoy Russell LLP (57) ABSTRACT

Methods and systems are provided for regenerating an exhaust particulate filter during an engine non-combusting condition. In one example, a method may include, responsive to a higher than first threshold soot load on the PF and a higher than threshold PF temperature, regenerating the PF by flowing compressed air through the PF via operation of an electric booster coupled to the intake manifold.

20 Claims, 3 Drawing Sheets

SYSTEMS AND METHODS FOR PARTICULATE FILTER REGENERATION

FIELD

The present description relates generally to methods and systems for particulate filter regeneration during an engine non-combusting condition.

BACKGROUND/SUMMARY

Engine combustion using gasoline fuel may generate particulate matter (PM) (such as soot and aerosols) that may be exhausted to the atmosphere. To enable emissions compliance, particulate filters (PF) may be included in the engine exhaust, to filter out exhaust PMs before releasing the exhaust to the atmosphere. Such devices may be periodically or opportunistically regenerated during operation of an engine to decrease the amount of trapped particulate matter. Regeneration is typically achieved by raising a temperature of the PF to a predetermined level for a sustained period, while flowing exhaust gas of a defined composition through the PF in order to burn or oxidize the trapped particulate matter. During engine start-stop (idle stop) conditions, deceleration fuel shut-off (DFSO) conditions, and periods of vehicle operation using machine torque, there may not be sufficient time for completing regeneration of the PF.

Various approaches are provided for regenerating a PF during engine shut-down conditions. In one example, as shown in U.S. Pat. No. 8,844,272, Bidner et al. disclose a method for operating a vacuum pump coupled to the engine intake manifold to route ambient air via the engine exhaust manifold during engine-off conditions. Oxygen in the ambient air flowing through the PF may facilitate in regenerating the PF during engine-off conditions when the temperature of the PF is above a threshold temperature.

However, the inventors herein have recognized potential disadvantages with the above approach. As one example, operating the intake vacuum pump to draw in ambient air from the exhaust manifold may be a time consuming process due to the time required for a vacuum to build up in the exhaust manifold. A high powered pump may be desired to remove air from the exhaust system and the EGR passage for vacuum generation. By the time sufficient oxygen from ambient air reaches the PF, the temperature of the exhaust passage including the PF may reduce below a threshold temperature as desired for PF regeneration. Incomplete PF regeneration may cause a higher than desired amount of PM to remain on the PF, thereby increasing exhaust back pressure which may adversely affect engine performance during subsequent engine cycles.

The inventors herein have identified systems and methods by which issues with the above approaches are resolved. One example method comprises, method, sing: during a non-combusting condition of an engine coupled to a vehicle, responsive to a higher than first threshold soot load on a particulate filter (PF) coupled to an exhaust passage of the engine and a PF temperature greater than a threshold temperature needed for soot oxidation in presence of oxygen, activating an electric booster in an intake system of the engine to rout: compressed air to the PF for PF regeneration. In this way, by operating an electric booster during engine non-combusting conditions, a motive force may be provided to route compressed air via the PF for PF regeneration.

In one example, the PF may be opportunistically regenerated during an engine non-combusting condition. The engine may be a boosted engine comprising a turbine driven intake air compressor and an electrically driven intake air compressor (herein also referred to as a battery operated electric booster) that is selectively operated for providing additional boost during increased torque demand. If during an engine non-combusting condition, engine start-stop condition, deceleration fuel shut-off (DFSO) condition, and a period of vehicle operation using machine torque, it is estimated that the PM load on the PF is higher than a threshold load and a temperature of the exhaust passage including the PF is higher than a threshold temperature, PF regeneration may be initiated. The intake throttle may be actuated to a completely open position and the electric booster may be activated to flow compressed ambient air from the engine intake passage to the PF. An exhaust gas recirculation (EGR) valve coupled to an EGR passage may be opened and also a wastegate valve coupled to a wastegate passage may be opened to facilitate flow of compressed air from the intake manifold to the exhaust manifold. At the elevated temperature, in the presence of oxygen from the compressed air, the PM may be burnt and the PF may be regenerated. The compressed airflow may provide the motive force to flow heated air from an exhaust catalyst coupled to the exhaust passage upstream of the PF to the PF to further expedite the regeneration. Flow of compressed air may be continued until one or more of the PF regeneration being complete, the PF temperature reducing below the threshold temperature, and initiation of engine combustion.

In this way, by opportunistically using existing engine components, such as an electric booster, regeneration of a particulate filter may be carried out even during engine non-combusting conditions, thereby eliminating the need for additional engine components. By using an electric booster, compressed air with a high oxygen content may be supplied to the PF within a short duration after engine shut-down. The technical effect of carrying out particulate filter regeneration during an engine-off condition is that for hybrid vehicles with short engine run-times, a clean PF may be maintained, thereby improving emissions quality and engine performance. In this way, residual exhaust heat may be optimally utilized for PF regeneration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
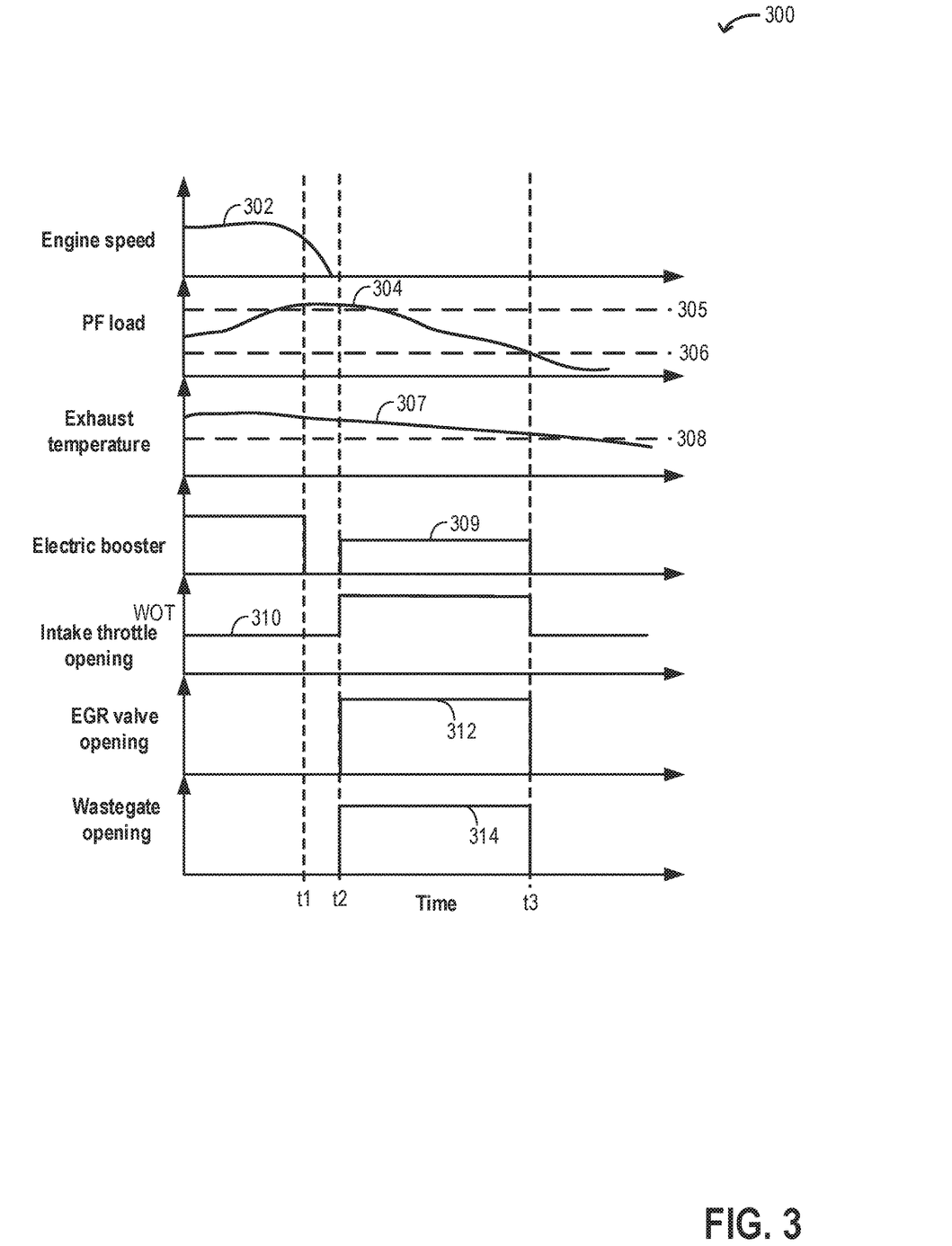
FIG. 3 shows an example operation of the electric booster for PF regeneration.

The following description relates to systems and methods for regenerating an exhaust particulate filter (PF) during an engine non-combusting condition. Such methods may include flowing compressed air through the PF coupled to the hybrid vehicle system depicted in FIG. 1. An engine controller may be configured to perform a control routine, such as the example routine of FIG. 3, to opportunistically regenerate the PF. Example electric booster operations to enable PF regeneration is shown in FIG. 3.

Figure 1:
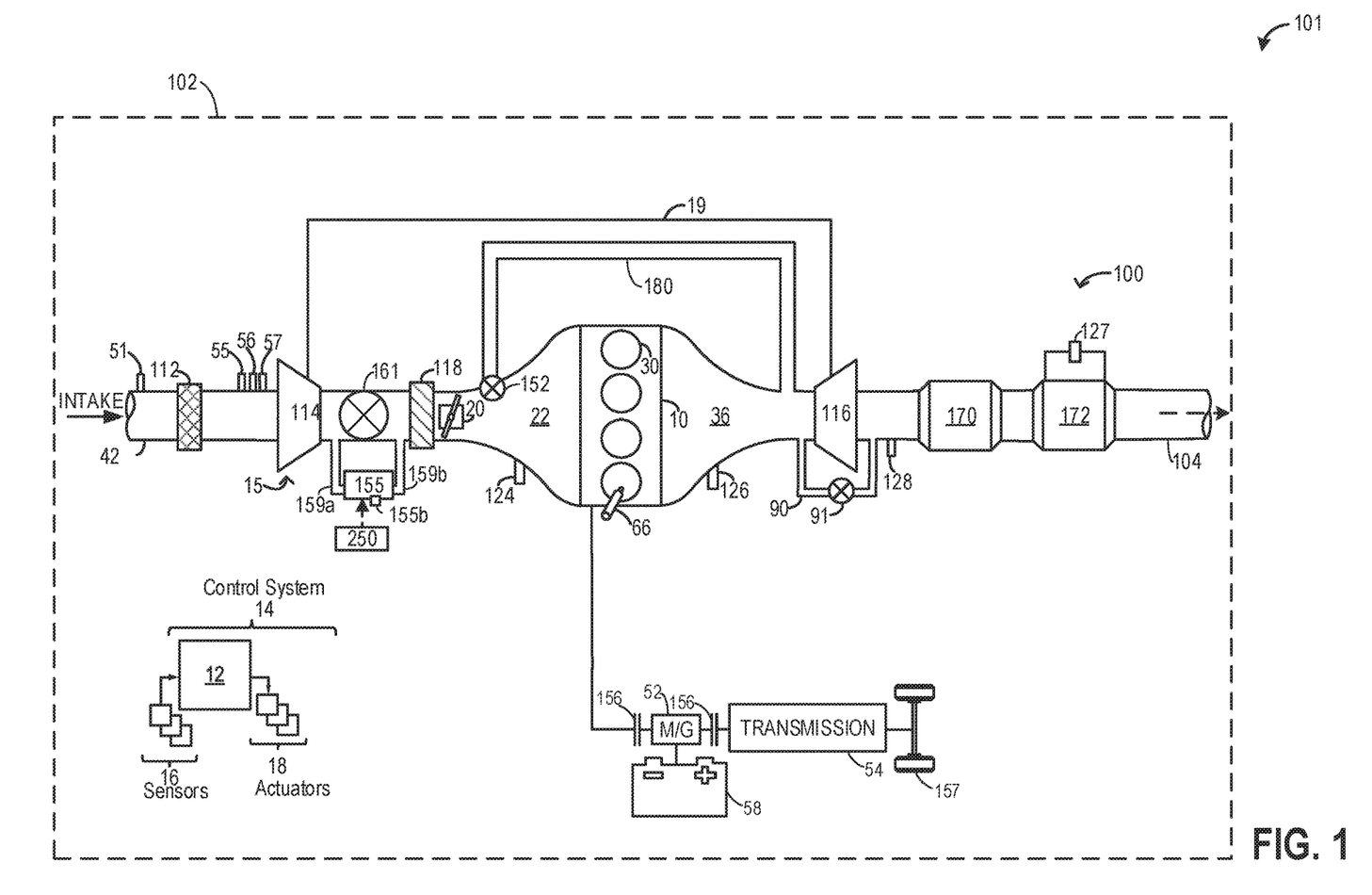
FIG. 1 schematically shows an example hybrid vehicle system including a particulate filter (PF).

FIG. 1 shows a schematic view 101 of a vehicle system 102 with an example engine system 100 including an engine 10. In one example, the engine system 100 may be a diesel engine system. In another example, the engine system 100 may be a gasoline engine system. In the depicted embodiment, engine 10 is a boosted engine coupled to a turbocharger 15 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled through charge-air cooler (CAC) 118 to throttle valve 20. Throttle valve 20 is coupled to engine intake manifold 22. From the compressor, the compressed air charge flows through the charge-air cooler 118 and the throttle valve 20 to the intake manifold 22. In the embodiment shown in FIG. 1, the pressure of the air charge within the intake manifold 22 is sensed by manifold air pressure (MAP) sensor 124. Temperature of ambient air entering the intake passage 42 may be estimated via an intake air temperature (IAT) sensor 51.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, an ambient humidity sensor 57 may be coupled to the inlet for estimating a humidity of aircharge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate valve 91 may be actuated open to dump at least some exhaust pressure from upstream of the turbine to a location downstream of the turbine via wastegate passage 90. By reducing exhaust pressure upstream of the turbine, turbine speed can be reduced, which in turn helps to reduce compressor surge.

To assist the turbocharger 15, an additional intake air compressor, herein also referred to as an electric booster 155, may be incorporated into the vehicle propulsion system. Electric booster 155 may be powered via an onboard energy storage device 250, which may comprise a battery, capacitor, supercapacitor, etc. The electric booster may include a compressor driven by an electric motor. A speed of operation of the electric booster may include adjusting a speed of operation of the electric motor, the electric motor operated via the on-board energy storage device 250.

In one example, electric booster 155 may be actuated in response to a demand for increased wheel torque, in order to provide the desired boost air rapidly to the engine while the turbocharger turbine spools up. As a result, the increased torque can be met without incurring the turbo lag which may otherwise have occurred if the assist from the electric booster was not available. In such an example, responsive to the turbocharger spooling up to a threshold speed (e.g. 70,000 rpm), the electric booster 155 may be actuated off, or deactivated. More specifically, operational control of the electric booster 155 may be achieved based on command signals (e.g. duty cycle or pulse width signals) received from the vehicle controller (e.g. controller 12). For example, the controller may send a signal to an electric booster actuator 155b, which may actuate on the electric booster. In another example, the controller may send a signal to the electric booster actuator 155b, which may actuate off the electric booster. In one example the electric booster actuator may comprise an electric motor which drives the compression of air.

Electric booster 155 may be positioned between a first electric booster conduit 159a, and a second electric booster conduit 159b. First electric booster conduit 159a may fluidically couple intake passage 42 to electric booster 155 upstream of electric booster bypass valve 161. Second electric booster conduit 159b may fluidically couple booster 155 to intake passage 42 downstream of electric booster bypass valve 161. As an example, air may be drawn into electric booster 155 via first electric booster conduit 159a upstream of electric booster bypass valve 161, and compressed air may exit electric booster 155 and be routed via second electric booster conduit to intake passage 42 downstream of electric booster bypass valve 161. In this way, compressed air may be routed to engine intake 22.

In circumstances where the electric booster 155 is activated to provide boost more rapidly than if the turbocharger 15 were solely relied upon, it may be understood that electric booster bypass valve 161 may be commanded closed while electric booster 155 is activated. In this way, intake air may flow through turbocharger 15 and through electric booster 155. Once the turbocharger reaches the threshold speed, the electric booster 155 may be turned off, and the electric booster bypass valve 161 may be commanded open.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

Exhaust gas recirculation (EGR) delivery passage 180 may be coupled to the exhaust passage 104 upstream of turbine 116 to provide high pressure EGR (HP-EGR) to the engine intake manifold, downstream of compressor 114. An EGR valve 152 may be coupled to the EGR passage 181 at the junction of the EGR passage 180 and the intake passage 42. EGR valve 152 may be opened to admit a controlled amount of exhaust to the compressor outlet for desirable combustion and emissions control performance. EGR valve 152 may be configured as a continuously variable valve or as an on/off valve. In further embodiments, the engine system may include a low pressure EGR (LP-EGR) flow path wherein exhaust gas is drawn from downstream of turbine 116 and recirculated to the engine intake manifold, upstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors coupled to the compressor inlet.

A plurality of sensors, including an exhaust temperature sensor 128, an exhaust oxygen sensor, and an exhaust flow sensor may be coupled to the main exhaust passage 104. The oxygen sensor may be linear oxygen sensors or UEGO (universal or wide-range exhaust gas oxygen), two-state oxygen sensors or EGO, HEGO (heated EGO), a NOx, HC, or CO sensors.

As shown in FIG. 1, exhaust from the one or more exhaust manifold sections may be directed to turbine 116 to drive the turbine. The combined flow from the turbine and the wastegate passage then flows through exhaust after-treatment device 170. In one example, the emission control device 170 may be a light-off catalyst. In general, the exhaust after-treatment device 170 is configured to catalytically treat the exhaust flow, and thereby reduce an amount of one or more substances in the exhaust flow. For example, the exhaust after-treatment device 170 may be configured to trap $NO_x$ from the exhaust flow when the exhaust flow is lean, and to reduce the trapped $NO_x$ when the exhaust flow is rich. In other examples, the exhaust after-treatment device 170 may be configured to disproportionate $NO_x$ or to selectively reduce $NO_x$ with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together.

A particulate filter (PF) 172 may be coupled to the exhaust passage 104 downstream of the exhaust after-treatment device 170. The particulate filter 172 may be a gasoline particulate filter or a diesel particulate filter. A substrate of the particulate filter 172 may be made of ceramic, silicon, metal, paper, or combinations thereof. During operation of the engine 10, particulate filter 172 may capture exhaust particulate matter (PMs), such as ash and soot (e.g., from unburned hydrocarbons) in order to reduce vehicle emissions. The soot may accumulate on the surfaces of the particulate filter thereby creating an exhaust backpressure. The exhaust backpressure may negatively influence the engine efficiency. In order to avoid high backpressure, when the PF soot loading reaches a threshold load, the engine 10 may opportunistically regenerate the PF during a higher than threshold exhaust temperature and a leaner than stoichiometric air fuel ratio condition.

Pressure in the exhaust system may be assessed by pressure sensor 127. Pressure sensor 127 may be a differential pressure sensor coupled across PF 172, for example. A load of PM accumulated on the PF 172 may be estimated based on the pressure drop across the PF as estimated via the pressure sensor 127.

The hybrid vehicle may be operated for prolonged durations using machine torque, and also during engine operations there may be non-combusting conditions such as engine idle stops and deceleration fuel shut-off (DFSO) conditions. PF 172 regeneration may not be completed during engine combusting conditions and PF regeneration is desired to be carried out or continued during engine non-combusting conditions including a vehicle key-off condition. During an engine non-combusting condition, if the soot load on the PF 172 is higher than a first threshold soot load and a PF temperature is greater than a threshold temperature, PF regeneration may be initiated by routing compressed air via the PF 172. Regenerating the PF 172 includes burning the soot load on the PF 172 until the soot load reduces to below a second threshold, the first threshold higher than the second threshold. The electric booster 155 may be operated to flow compressed air from the intake manifold 22 to the PF 172. Prior to operation of the electric booster, each of the intake throttle 20, the EGR valve 152, and the wastegate valve 91 may be opened. The ambient air entering via the open throttle may be compressed at the electric booster 155 and then the compressed air may flow to the PF 172 via each of the EGR passage 180 and the wastegate passage 90. Operation of the electric booster 155 may be continued until one or more of the soot load on the PF 172 decreases below a second threshold and the temperature of the PF 172 decreases below the threshold temperature.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the turbine 116, MAP sensor 124, exhaust temperature sensor 128, exhaust pressure sensor 127, compressor inlet temperature sensor 55, compressor inlet pressure sensor 56, ambient humidity sensor 57, IAT sensor 51, engine coolant temperature sensor, and EGR sensor. Other sensors such as additional pressure, temperature, air/fuel ratio, and composition sensors may be coupled to various locations in engine system 100.

The actuators 18 may include, for example, electric booster bypass valve 161, throttle 20, electric booster actuator 155b, EGR valve 152, wastegate valve 91, and fuel injector 66. The control system 14 may include a controller 12. The controller 12 may receive input data from the various sensors, process the input data, and trigger various actuators in response to the processed input data based on instruction or code programmed therein corresponding to one or more routines. In one example, during an engine non-combusting condition, in response to a higher than threshold, the controller may estimate a PM load on the PF via the pressure sensor 127 and an exhaust temperature via the temperature sensor 128, and in response to each of a higher than threshold PM load on the PF and a higher than threshold exhaust temperature, controller 12 may send a signal to each of the electric booster bypass valve 161 to actuate the valve to a closed position, and to the booster actuator 155b to actuate the electric booster 155 to route compressed air through the PF for PF regeneration.

In some examples, vehicle 102 may be a hybrid vehicle with multiple sources of torque available to one or more vehicle wheels 157. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Crankshaft of engine 10 and electric machine 52 are connected via a transmission 54 to vehicle wheels 157 when one or more clutches 156 are engaged. In the depicted example, a first clutch 156 is provided between crankshaft and electric machine 52, and a second clutch 156 is provided between electric machine 52 and transmission 54. Controller 12 may send a signal to an actuator of each clutch 156 to engage or disengage the clutch, so as to connect or disconnect crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 157. Electric machine 52 may also be operated as a generator to provide electrical power to charge traction battery 58, for example during a braking operation.

In this way, the components of FIG. 1 enable a system for a vehicle, including an autonomous vehicle and/or a hybrid vehicle, an engine including one or more cylinders, an intake manifold, and an exhaust manifold, an intake passage including a turbine driven compressor, a charge air cooler (CAC) downstream of the compressor, and an intake throttle downstream of the CAC, a conduit coupled to the intake passage downstream of the compressor and upstream of the CAC, the conduit including a motor-driven electric compressor, an electric compressor bypass valve coupled at a junction of the intake passage and the conduit, an exhaust passage including the turbine, a particulate filter (PF), a differential pressure sensor coupled across the PF, and a temperature sensor upstream of the PF, an exhaust gas recirculation (EGR) passage coupling the exhaust manifold to the intake manifold, downstream of the compressor, the EGR passage including an EGR valve, an wastegate passage coupled to the exhaust passage from upstream of the turbine to downstream of the turbine, the wastegate passage including a wastegate valve. The system further includes a controller with computer readable instructions stored on non-transitory memory to control the following when the engine is not combusting fuel and air: estimate a particulate matter (PM) load on the PF via the differential pressure sensor, estimate an exhaust temperature via the temperature sensor, in response to each of the PM load being higher than a threshold load and the exhaust temperature being higher than a threshold temperature, opening each of the throttle, the EGR valve, and the wastegate valve, and operating the electric booster for a duration to route compressed air to the PF for regeneration.

Figure 2:
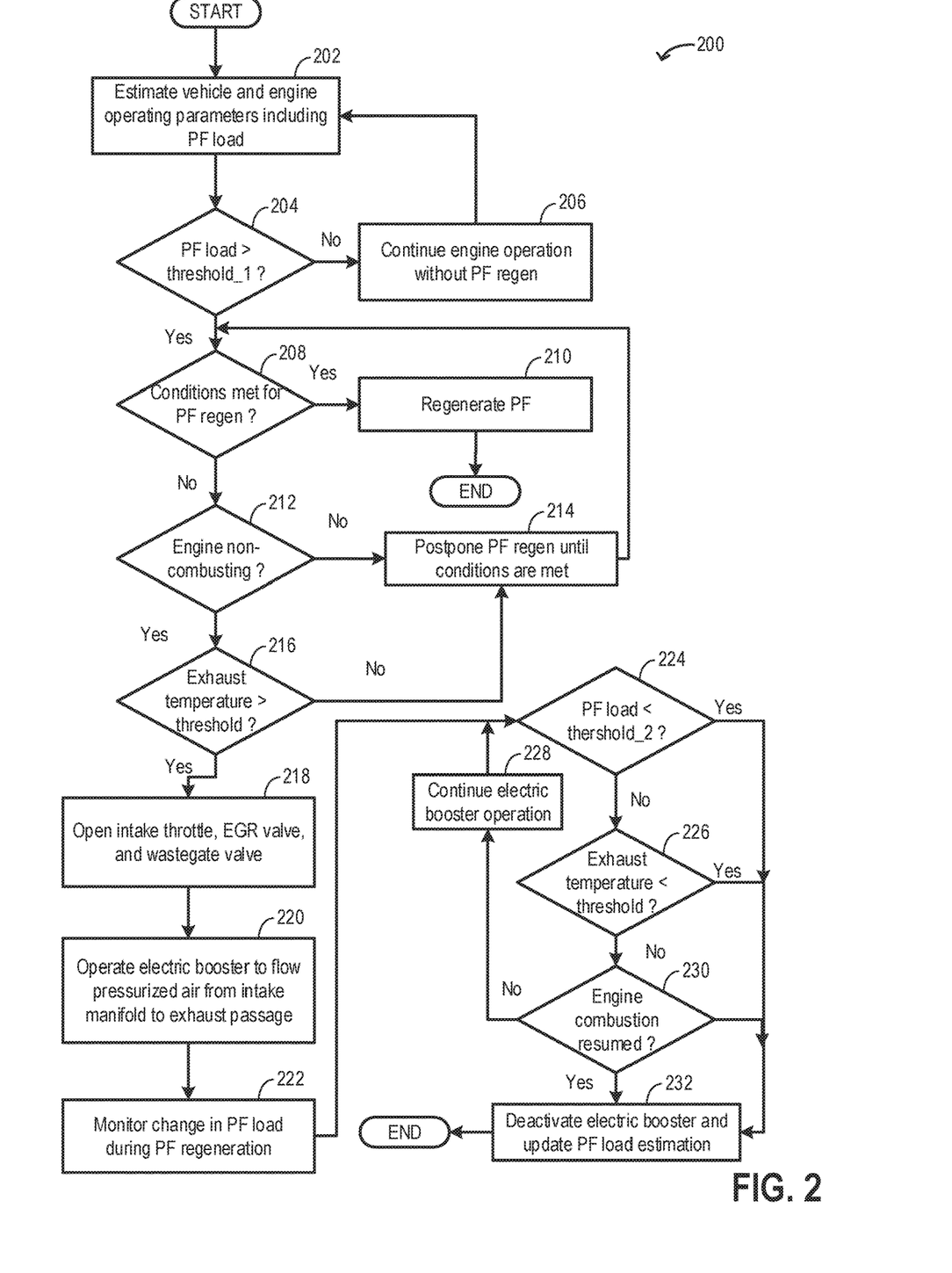
FIG. 2 shows a flow chart illustrating an example method that can be implemented to regenerate the PF during an engine non-combusting condition.

FIG. 2 shows an example method 200 that may be implemented for regenerating an exhaust particulate filter (PF) during an engine non-combusting condition. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, current engine and vehicle operating conditions may be estimated, measured, and/or inferred. Operating conditions may include one or more vehicle conditions, such as vehicle speed, vehicle location, etc., various engine conditions, such as engine status, engine load, engine speed, A/F ratio, engine temperature, exhaust temperature, exhaust pressure, various evaporative emissions system conditions, as well as various ambient conditions, such as ambient temperature, humidity, barometric pressure, etc. A particulate matter (herein also referred to as soot) load on the PF may be estimated as a function of exhaust pressure. The exhaust pressure may be estimated via a differential exhaust pressure sensor (such as pressure sensor 127 in FIG. 1) coupled across the PF. The PF soot load may be directly proportional to the exhaust pressure. In one example, the controller may use a look-up table to determine PF loading based on the estimated exhaust pressure with input being exhaust pressure and the output being PF soot load.

At 204, the routine includes determining if the soot load on the PF is higher than a first threshold (threshold_1) load. Threshold_1 may be calibrated based on exhaust back pressure and the threshold_1 soot load may correspond to a soot load level above which exhaust expulsion from cylinders may be adversely affected, negatively influencing engine efficiency. If it is determined that the PF load is lower than threshold_1, it may be inferred that PF regeneration may not be desired at the time. At 206, current engine operation may be continued without initiating PF regeneration. In one example, an electric booster (such as electric booster 155 in FIG. 1) may be operated as required to provide boost assist during an increased torque demand. The electric booster may be coupled to a conduit parallel to an intake passage, the conduit coupled to the intake passage downstream of an intake compressor and upstream of a charge air cooler. During conditions when the boost pressure provided by operating the turbocharger (such as intake compressor 114 and exhaust turbine 116 in FIG. 1) is lower than a desired boost pressure, the electric booster may be operated using energy from an onboard energy storage device (such as energy storage device 250 in FIG. 1) to provide the desired boost. The speed and duration of operation of the electric booster may be adjusted based on turbocharger speed, and torque demand as estimated via a pedal position sensor. In one example, the speed and duration of operation of the electric booster may be increased with an increase in the torque demand and a decrease in turbocharger speed. In another example, the speed and duration of operation of the electric booster may be decreased with a decrease in the torque demand and an increase in turbocharger speed.

If it is determined that the soot load on the PF is higher than threshold_1, at 208, the routine includes determining if conditions are met for PF regeneration. Conditions for PF regeneration may include, a higher than threshold engine load such that a higher than threshold exhaust temperature may be available for PF regeneration. PF regeneration may be carried out at a higher than threshold exhaust temperature. The threshold exhaust temperature may be calibrated based on the temperature desired to oxidize the accumulated particulate matter in presence of oxygen. When the engine load is higher than the threshold load, the thermal output of the engine may be capable of sustaining the PF regeneration and the entire volume of PM accumulated on the PF may be combusted. PF regeneration may be carried out during deceleration fuel shut off (DFSO) conditions when excess oxygen is available in the exhaust airflow which may facilitate in PF regeneration. Further, PF regeneration may be carried out during leaner than stoichiometric engine operations such that the accumulated soot may be oxidized.

If it is determined that the conditions for PF regeneration are met, at 210, the PF may be regenerated by oxidizing the accumulated soot. In one example, during PF regeneration, fuel from the fuel tank may be injected to the exhaust passage via a fuel injector to further expedite combustion of soot at the PF.

If it is determined that conditions for PF regeneration are not met, at 212, the routine includes determining if the engine is in a non-combusting condition. An engine non-combusting condition may include an engine idle-stop condition, a deceleration fuel shut-off (DFSO) condition, and an engine shut-down event. For example, engine combustion may be suspended when one or more idle-stop conditions are met. As an example, engine idle-stop conditions may include, engine idling for a longer than threshold duration (such as at a traffic stop), a greater then threshold (such as at least more that 30% charged) state of charge (SOC) of the battery coupled to the electric machine, the air conditioner not issuing a request for restarting the engine (as may be requested if air conditioning is desired). Also, if the vehicle speed is lower than a threshold (e.g., 3 mph) an engine ide-stop may be requested even if the vehicle is not at rest. Further, prior to an engine idle-stop, an emission control device coupled to the exhaust manifold of engine may be analyzed to determine that no request for engine restart was made.

As another example, during a DFSO condition, fuel injection to the engine cylinders may be suspended while cylinder valves continue to operate and pump air through the cylinder, and the engine continues to spin. In one example, the DFSO condition may be in response to an accelerator pedal tip-out (that is, where the operator has released an accelerator pedal and requested a decrease in torque), such as when the vehicle may be coasting.

As yet another example, the engine may be non-combusting and held shut-down when the vehicle is propelled using only motor torque from an electric machine (such as electric machine 52 in FIG. 1) of the hybrid electric vehicle (HEV). The vehicle may be propelled via motor torque during lower than threshold engine load conditions and higher than threshold SOC of the electric machine battery. The threshold engine load may be calibrated based on vehicle operating conditions including vehicle speed and the battery SOC. The threshold SOC may correspond to a minimum motor power requested to propel the vehicle. As a further example, the engine may be non-combusting and held shut-down when the vehicle is at rest and not being propelled via engine torque and/or motor torque.

If it is determined that any of the engine non-combusting conditions are not met, it may be inferred that the engine is combusting air and fuel. At 214, PF regeneration may be postponed until conditions for PF regeneration are met. In one example, the controller may actively adjust engine operating parameters such as by enleaning the air fuel ratio and retarding spark timing from maximum brake torque (MBT) to increase exhaust temperature.

If it is determined that the engine is in a non-combusting condition, at 216, the routine includes determining if the exhaust temperature or the PF temperature as estimated via an exhaust temperature sensor (such as temperature sensor 128 in FIG. 1) coupled to the exhaust passage upstream of the PF is higher than the threshold exhaust temperature. As described previously, the threshold exhaust temperature may be calibrated based on the temperature desired to burn the accumulated particulate matter. Even after suspension of combustion, residual exhaust heat may remain and the heat may be opportunistically used to regenerate the PF. In one example, the exhaust catalyst (such as exhaust after-treatment device 170 in FIG. 1) upstream of the PF may retain heat for a longer duration and this heat may be channelized to the PF to initiate PF regeneration. In one example, a heater may be coupled to the PF and during a lower than threshold exhaust temperature, the heater may be activated to increase the temperature of the PF to the threshold temperature.

If it is determined that the exhaust temperature is lower than the threshold exhaust temperature, the routine may proceed to step 214 and PF regeneration may be postponed until the conditions for PF regeneration may be met such as after a subsequent engine combusting condition. If it is determined that the exhaust temperature is higher than the threshold temperature, at 218, the controller may send a signal to an actuator coupled to an intake throttle (such as intake throttle 20 in FIG. 1) to actuate the throttle to a wide open position. The controller may also send a signal to the exhaust gas recirculation valve (such as EGR valve 152 in FIG. 1) coupled to an EGR passage to completely open the EGR valve. Further, the controller may send a signal to a wastegate valve (such as wastegate valve 91 in FIG. 1) to actuate the wastegate valve to a completely open position.

At 220, the electric air compressor may be operated to flow pressurized air via the PF to initiate PF regeneration. The controller may send a signal to the electric air compressor actuator (such as actuator 155*b* in FIG. 1) to actuate the electric air compressor using energy from the energy storage device coupled to the electric booster. As the ambient air entering the intake manifold via the wide open throttle flows through the electric air compressor, the air is pressurized (compressed) and then the compressed air may flow from the intake manifold to the exhaust passage via each of the EGR passage and the wastegate passage. Since the engine is not rotating, the intake and exhaust valves of one or more cylinders may not be in an open position to allow flow of compressed air from the intake manifold to the exhaust passage. However, the open EGR valve provides a pathway for the air via the EGR passage. As the compressed air enters the exhaust manifold, the wastegate passage provides a lower resistance path for the compressed air relative to the turbine and facilitates air flow to the PF. As air flowing to the PF via the catalyst upstream of the PF provides a motive force for transferring heat from the catalyst to the PF. The heated air flowing through the PF may initiate oxidation of the soot accumulated on the PF. Since the air is compressed, there is a higher concentration of oxygen present in the PF. At the elevated temperature and in the presence of oxygen, the soot accumulated on the PF may be oxidized.

At 222, a change in PF load may be monitored during the regeneration process. As the regeneration continues, the soot load on the PF may continually decrease and there may be a corresponding change in exhaust pressure as estimated via the differential pressure sensor coupled across the PF.

At 224, the routine includes determining if the PF load has reduced to below a second threshold (threshold_2) load. Threshold_2 may be calibrated based on exhaust back pressure and the threshold_1 soot load may correspond to a soot load level at which the corresponding exhaust back pressure may not adversely affect engine operations. Also, below the threshold_2 soot load, the filtering capability of the PF may be adversely affected. Therefore, it may not be desired to remove any further soot from the PF once PF load reaches threshold_2. Therefore, if it is determined that the PF load has reached threshold_2, at 232, the controller may send a signal to the electric booster actuator to deactivate the electric booster. Once the electric booster is deactivated, the air flow via the PF may be suspended, thereby reducing the availability of oxygen at the PF (as desired to sustain the regeneration process). Therefore, the PF regeneration is stopped and the engine may return to the non-combusting condition. The duration of operation of the electric booster may be directly proportional to a difference between the PM load and threshold_1. The duration of operation of the electric booster may increase with an increase in the difference between the PM load and threshold_1 and similarly, the duration of operation of the electric booster may decrease with a decrease in the difference between the PM load and threshold_1.

The position of the intake throttle, EGR valve, and the wastegate valve may be adjusted to their respective positions prior to the operation of the electric booster. At the end of the regeneration process, a PF load remaining may be estimated as a function of the pressure drop across the PF as estimated via the differential pressure sensor.

If it is determined that the PF load is higher than threshold_2, at 226, the routine includes determining if the exhaust temperature has reduced to below the threshold exhaust temperature. Since combustion is not carried out, there may not be any active heat supply to the PF. If the exhaust temperature reduces to below the threshold temperature, the oxidation reaction of the accumulated soot particles may no longer take place. Therefore, if it is determined that even if the soot load on the PF is higher than threshold_2, the exhaust temperature is lower than the threshold temperature, the routine may proceed to step 230 wherein the electric booster may be deactivated to suspend flow of compressed air via the PF and the PF load estimation may be updated.

If it is determined that the exhaust temperature continues to remain above the threshold temperature, at 230, the controller may determine if engine combustion has been resumed. Combustion may be resumed in response to one or more of an increase in torque demand (accelerator pedal tip-in), SOC of the battery coupled to the electric machine reducing to below the threshold SOC, and vehicle key-on. Upon initiation of combustion, the electric booster speed operation may be adjusted based on torque demand. Also, the positions of each of the intake throttle, the EGR valve, and the wastegate valve may be adjusted based on engine operating parameters such as engine load, engine speed, and engine temperature. Therefore, if it is determined that engine combustion has been resumed, even if the PF regeneration has not completed, the routine may proceed to 232 to deactivate the electric booster. In one example, based on the engine boost demand, the electric booster may be continued to be operated irrespective of the PF soot load.

During an immediately subsequent engine start (combustion), one or more engine operating parameters such as air fuel ratio, spark timing, etc. may be adjusted based on the state of PF regeneration. In one example, regeneration may have started and been terminated before the regeneration of the particulate filter was completed (e.g., regeneration was partially completed). In another example, depending on a temperature of the three-way catalyst during engine shutdown regeneration, more or less excess oxygen may have been stored at a three-way catalyst upstream of the PF.

For example, if the regeneration was attempted and only partially completed, there may be less oxygen in the three way catalyst than if the regeneration had been more fully carried out. As such, the air fuel ratio may be adjusted to be more rich (or less lean) of stoichiometry in order to reduce the excess oxygen in the three way catalyst during the engine start. In another example, the engine may be started in such a way as to continue regeneration if it was not completed during engine non-combusting phase. For example, in a vehicle with a hybrid-electric propulsion system, the engine may need to be started as the vehicle accelerates and regeneration of the particulate filter during the engine shutdown may not have completed. As such, the air-fuel ratio may be adjusted to be lean of stoichiometry and the spark timing may be retarded in order to continue to supply the particulate filter with oxygen for regeneration. Therefore, based on the state of the regeneration during engine shutdown, the engine may be restarted in such a manner so as to continue the regeneration or reduce the effects of the regeneration on components such as the three way catalyst.

If it is determined that the PF load is lower than threshold_2, the exhaust temperature is higher than the threshold temperature, and that engine combustion has not been resumed, at 228, electric booster operation may be continued to provide compressed air to the PF for regeneration.

In this way, during an engine-off condition, responsive to a soot load on a particulate filter (PF) coupled to an exhaust passage of an engine being higher than a first threshold load, the PF may be selectively regenerated by routing compressed air from an intake passage of the engine to the PF, the compressed air routed to the PF by operating an electric booster coupled to the intake passage.

FIG. 3 shows an example operating sequence 300 illustrating example operation of an electric booster (such as electric booster 155 in FIG. 1) coupled to an engine intake manifold for particulate filter (such as PF 172 in FIG. 1) regeneration. The horizontal (x-axis) denotes time and the vertical markers t1-t3 identify significant times in PF regeneration.

The first plot, line 502, shows variation in engine speed over time. The second plot, line 304, shows an amount of soot load accumulated on the PF as estimated based on a pressure drop across the PF measured via a differential pressure sensor coupled across the PF (such as pressure sensor 127 in FIG. 1). Dashed line 305 denotes an upper threshold load above which the PF is desired to be regenerated and the dashed line 306 denotes a lower threshold load at which the regeneration may be discontinued. The upper threshold 305 may be calibrated based on exhaust back pressure which may negatively influence engine efficiency. The lower threshold 306 may be calibrated based on exhaust back pressure which may no longer adversely affect engine performance. The third plot, line 307, shows variation in exhaust temperature as estimated based on input from an exhaust temperature sensor (such as temperature sensor 128 in FIG. 1) coupled to the exhaust passage upstream of the PF. Dashed line 308 denotes a threshold exhaust temperature above which soot deposited on the PF may be oxidized in the presence of oxygen. The threshold exhaust temperature 308 may be calibrated based on the temperature desired to burn the accumulated particulate matter. The fourth plot, line 309, shows operation of the electric booster. The fifth plot, line 310, shows an opening of an intake throttle. The fifth plot, line 312, shows an opening of an exhaust gas recirculation (EGR) valve coupled to an EGR passage. The sixth plot, line 314, shows a position of a wastegate valve housed in a wastegate passage which is coupled in parallel to a turbine positioned in an exhaust system.

Prior to time t1, the engine is operated for vehicle propulsion and the electric booster is operated to provide the desired boost pressure. The opening of the intake throttle is adjusted based on torque demand. During this time, based on engine dilution demands, EGR is not desired and the EGR valve is maintained in a closed position. Based on the torque demand, it is desired to route the entire volume of exhaust via the exhaust turbine, therefore, the wastegate valve is maintained in a closed position. The PF load continues to increase and reaches the upper threshold 305 and the PF is desired to be opportunistically regenerated. However, at time t1, the engine is shut down and the engine speed reduces to zero. During engine shut-down, there is no active air (oxygen) supply through the PF, thereby reducing the possibility of PF regeneration.

At time t2, based on a higher than threshold 308 exhaust temperature it is inferred that in the presence of oxygen, PF regeneration can be initiated. Once the engine stops spinning completely, the controller sends a signal to the intake throttle to increase the opening of the throttle to a completely open position. The controller send signals to each of the actuator coupled to the EGR valve to completely open the EGR valve and the actuator coupled to wastegate valve to completely open the wastegate valve. Then the controller sends a signal to the actuator coupled to the electric booster to initiate operation of the electric booster. The speed of operation of the electric booster for supplying compressed air to the PF is lower than the speed of operation of the electric booster for providing the desired boost pressure (such as the speed of operation prior to time t1). Between time t2 and t3, air entering via the wide open throttle is compressed at the electric booster and the compressed air is routed to the PF via the open EGR passage and the open wastegate passage. The compressed air provides a motive force for the thermal energy from the exhaust passage to reach the PF. In the presence of oxygen from the compressed air and the higher than threshold exhaust temperature, the soot accumulated on the PF is oxidized and the PF load decreases steadily.

At time t3, in response to the PF load decreasing to below the second threshold 306 it is inferred that PF regeneration is complete and further oxidation of soot is no longer desired. Therefore, the controller sends a signal to the electric booster actuator to suspend operation of the electric booster. As the compressed air flow via the PF stops, the availability of oxygen decreases and PF regeneration is suspended. Also, after time t3, the exhaust temperature reduces to below the threshold temperature 308, thereby causing oxidation of soot to stop. Upon completion of PF regeneration, the intake throttle is actuated to a position of the throttle prior to initiation of PF regeneration (such as prior to time t2), the EGR valve is closed, and the wastegate valve is closed. The engine is maintained in a non-combusting condition until further request for engine torque is available.

In this way, by opportunistically regenerating an exhaust particulate filter without spinning the engine during an engine non-combusting condition, emissions quality may be improved and operator preference of operating the vehicle via machine torque may be maintained. By flowing compressed air via the exhaust passage during PF regeneration, thermal energy from the exhaust catalyst positioned upstream of the PF may be routed to the PF to facilitate regeneration. The technical effect of repurposing the electric booster for PF regeneration is that additional engine components may not be required, thereby eliminating the need for additional components. Overall, by maintaining a clean PF, emissions quality and engine performance may be improved.

An example engine method comprises: during a non-combusting condition of an engine coupled to a vehicle, responsive to a higher than first threshold soot load on a particulate filter (PF) coupled to an exhaust passage of the engine and a PF temperature greater than a threshold temperature needed for soot oxidation in presence of oxygen, activating an electric booster in an intake system of the engine to route compressed air to the PF for PF regeneration.

An example method comprises: during a non-combusting condition of an engine coupled to a vehicle, responsive to a higher than first threshold soot load on a particulate filter (PF) coupled to an exhaust passage of the engine and a PF temperature greater than a threshold temperature needed for soot oxidation in presence of oxygen, activating an electric booster in an intake system of the engine to route compressed air to the PF for PF regeneration. In any preceding example, additionally or optionally, the non-combusting condition of the engine which drives a vehicle includes one of a deceleration shut-off of fuel delivered to the engine, an engine idle-stop condition, a vehicle key-off condition, and a period of vehicle propulsion via machine torque only. In any or all of the preceding examples, additionally or optionally, a soot load on the PF is estimated based on inputs from a differential pressure sensor coupled across the PF and wherein the PF temperature is estimated based on inputs from a temperature sensor coupled to the exhaust passage upstream of the PF. In any or all of the preceding examples, additionally or optionally, the electric air compressor is coupled to a conduit parallel to an intake passage of the engine, the conduit coupled to the intake passage downstream of an intake compressor and upstream of a charge air cooler, the method further comprising, closing an electric booster bypass valve coupled to the intake passage, downstream of the intake compressor, to direct ambient air into the conduit. In any or all of the preceding examples, additionally or optionally, the engine includes an exhaust gas recirculation passage coupling the exhaust passage to the intake passage, downstream of the electric booster, and wherein routing the compressed air to the PF further includes opening an exhaust gas recirculation (EGR) valve coupled to the exhaust gas recirculation passage to flow compressed air exiting the electric booster to the PF via the EGR passage. In any or all of the preceding examples, the method further comprises, additionally or optionally, while opening the EGR valve, actuating an intake throttle coupled to the intake passage downstream of the charge air cooler to a wide open position, and actuating a wastegate valve positioned in a wastegate passage which is coupled in parallel to a turbine positioned in an exhaust system, to route compressed air from the electric air compressor into the exhaust system. In any or all of the preceding examples, the method further comprises, additionally or optionally, deactivating the electric booster in response to the soot load on the PF reducing to below a second threshold soot load, the second threshold lower than the first threshold. In any or all of the preceding examples, the method further comprises, additionally or optionally, deactivating the electric booster in response to the PF temperature reducing to below the threshold temperature. In any or all of the preceding examples, the method further comprises, additionally or optionally, during the non-combusting condition of the engine, responsive to the higher than first threshold soot load on the PF and a lower than threshold exhaust temperature, activating a heater coupled to the PF prior to activating the electric booster.

Another example method comprises: during an engine-off condition, and responsive to a soot load on a particulate filter (PF) coupled to an exhaust passage of an engine being higher than a first threshold load, selectively regenerating the PF by routing compressed air from an intake passage of the engine to the PF, the compressed air supplied by operating an electric booster coupled to the intake passage and opening a throttle coupled to the intake passage. In any preceding example, additionally or optionally, selectively regenerating the PF is in response to a temperature of the PF being higher than a threshold temperature needed for soot oxidation during routing of compressed air via the PF. In any or all of the preceding examples, additionally or optionally, selectively regenerating the PF is in response to a temperature of a catalyst coupled to the exhaust passage upstream of the PF being higher than the threshold temperature, and wherein the compressed air is routed to the PF via the catalyst, the compressed air carrying thermal energy from the catalyst to the PF. In any or all of the preceding examples, the method further comprises, additionally or optionally, prior to operation of the electric booster, opening each of the throttle, an exhaust gas recirculation (EGR) valve coupled to an EGR passage connecting the intake passage to the exhaust passage, and a wastegate valve coupled to a wastegate passage to bypass a turbine coupled to the exhaust passage. In any or all of the preceding examples, additionally or optionally, routing compressed air includes routing ambient air compressed at the electric booster to the PF via each of the EGR passage and the wastegate passage. In any or all of the preceding examples, additionally or optionally, operation of the electric booster is continued until one or more of the soot load on the PF decreases below a second threshold and the temperature of the PF decreases below the threshold temperature. In any or all of the preceding examples, additionally or optionally, regenerating the PF includes burning the soot load on the PF until the soot load reduces to below the second threshold, the first threshold higher than the second threshold. In any or all of the preceding examples, additionally or optionally, an engine-off condition includes a condition when fuel injection and spark to one or more engine cylinders is deactivated to suspend combustion of fuel and air.

In yet another example, a system comprises: a controller with computer readable instructions stored on non-transitory memory to control the following when an engine coupled to a vehicle is not combusting fuel and air: estimate a particulate matter (PM) load on a particulate filter (PF) housed in an exhaust passage of the engine via a differential pressure sensor coupled across the PF; estimate an exhaust temperature via a temperature sensor coupled to the exhaust passage upstream of the PF; in response to each of the PM load being higher than a threshold load and the exhaust temperature being higher than a threshold temperature, opening each of an intake throttle, an exhaust gas recirculation (EGR) valve housed in an EGR passage coupling an exhaust manifold to an intake manifold, and a wastegate valve housed in a wastegate passage coupled to the exhaust passage from upstream of an exhaust turbine to downstream of the exhaust turbine, and operating a motor-driven electric compressor housed in a conduit coupled to an intake passage for a duration to route compressed air to the PF for regeneration. In any or all of the preceding examples, additionally or optionally, the duration of operating the electric booster is directly proportional to a difference between the PM load and the threshold load, the duration increasing with the difference. In any or all of the preceding examples, additionally or optionally, the vehicle is an autonomous vehicle and/or a hybrid vehicle and the PF is a heated PF, and during the operation of the electric booster, and wherein the controller includes further instructions to activate a heater coupled to the PF.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method, comprising:
during a non-combusting condition of an engine coupled to a vehicle, responsive to a higher than first threshold soot load on a particulate filter (PF) coupled to an exhaust passage of the engine and a PF temperature greater than a threshold temperature needed for soot oxidation in presence of oxygen, activating, via an electronic controller, an electric booster in an intake system of the engine to route compressed air to the PF for PF regeneration, wherein the electric booster is coupled to a conduit in parallel with an intake passage of the engine, the conduit coupled to the intake passage of the engine downstream of an intake compressor and upstream of a charge air cooler.

2. The method of claim 1, wherein the non-combusting condition of the engine which drives the vehicle includes one of a deceleration shut-off of fuel delivered to the engine, an engine idle-stop condition, a vehicle key-off condition, and a period of vehicle propulsion via machine torque only.

3. The method of claim 1, wherein a soot load on the PF is estimated based on inputs from a differential pressure sensor coupled across the PF and wherein the PF temperature is estimated based on inputs from a temperature sensor coupled to the exhaust passage upstream of the PF.

4. The method of claim 1, further comprising closing an electric booster bypass valve coupled to the intake passage, downstream of the intake compressor, to direct ambient air into the conduit.

5. The method of claim 4, wherein the engine includes an exhaust gas recirculation (EGR) passage coupling the exhaust passage to the intake passage, downstream of the electric booster, and wherein routing the compressed air to the PF further includes opening an EGR valve coupled to the EGR passage to flow compressed air exiting the electric booster to the PF via the EGR passage.

6. The method of claim 5, further comprising, while opening the EGR valve, actuating an intake throttle coupled to the intake passage downstream of the charge air cooler to a wide open position, and actuating a wastegate valve positioned in a wastegate passage which is coupled in parallel to a turbine positioned in an exhaust system, to route compressed air from the electric air compressor into the exhaust system.

7. The method of claim 1, further comprising, deactivating the electric booster in response to a soot load on the PF reducing to below a second threshold soot load, the second threshold lower than the first threshold.

8. The method of claim 1, further comprising deactivating the electric booster in response to the PF temperature reducing to below the threshold temperature.

9. The method of claim 1, further comprising, during the non-combusting condition of the engine, responsive to the higher than first threshold soot load on the PF and a lower than threshold exhaust temperature, activating a heater coupled to the PF prior to activating the electric booster.

10. A method, comprising:
during an engine-off condition, and
responsive to a soot load on a particulate filter (PF) coupled to an exhaust passage of an engine being higher than a first threshold load,
selectively regenerating the PF, via an electronic controller, by routing compressed air from an intake passage of the engine to the PF, the compressed air supplied by operating an electric booster coupled to the intake passage and opening a throttle coupled to the intake passage;
wherein the electric booster is coupled to a conduit parallel to the intake passage, the conduit coupled to the intake passage downstream of an intake compressor and upstream of a charge air cooler.

11. The method of claim 10, wherein selectively regenerating the PF is in response to a temperature of the PF being higher than a threshold temperature needed for soot oxidation during routing of compressed air via the PF.

12. The method of claim 11, wherein selectively regenerating the PF is in response to a temperature of a catalyst coupled to the exhaust passage upstream of the PF being higher than the threshold temperature, and wherein the compressed air is routed to the PF via the catalyst, the compressed air carrying thermal energy from the catalyst to the PF.

13. The method of claim 10, further comprising, prior to operation of the electric booster, opening each of the throttle, an exhaust gas recirculation (EGR) valve coupled to an EGR passage connecting the intake passage to the exhaust passage, and a wastegate valve coupled to a wastegate passage to bypass a turbine coupled to the exhaust passage.

14. The method of claim 13, wherein routing compressed air includes routing ambient air compressed at the electric booster to the PF via each of the EGR passage and the wastegate passage.

15. The method of claim 11, wherein operation of the electric booster is continued until the soot load on the PF decreases below a second threshold and/or the temperature of the PF decreases below the threshold temperature.

16. The method of claim 15, wherein regenerating the PF includes burning the soot load on the PF until the soot load reduces to below the second threshold, the first threshold higher than the second threshold.

17. The method of claim 11, wherein an engine-off condition includes a condition when fuel injection and spark to one or more engine cylinders is deactivated to suspend combustion of fuel and air.

18. A system, comprising:
a controller with computer readable instructions stored on non-transitory memory to control the following when an engine coupled to a vehicle is not combusting fuel and air:
estimate a particulate matter (PM) load on a particulate filter (PF) housed in an exhaust passage of the engine via a differential pressure sensor coupled across the PF;
estimate an exhaust temperature via a temperature sensor coupled to the exhaust passage upstream of the PF;
in response to each of the PM load being higher than a threshold load and the exhaust temperature being higher than a threshold temperature, opening each of an intake throttle, an exhaust gas recirculation (EGR) valve housed in an EGR passage coupling an exhaust manifold to an intake manifold, and a wastegate valve housed in a wastegate passage coupled to the exhaust passage from upstream of an exhaust turbine to downstream of the exhaust turbine, and operating a motor-driven electric compressor housed in a conduit coupled to an intake passage of the engine for a duration to route compressed air to the PF for regeneration, wherein the conduit is coupled in parallel with the intake passage of the engine, and wherein the conduit is coupled to the intake passage downstream of a turbocharger compressor and upstream of a charge air cooler.

19. The system of claim 18, wherein the duration of operating the motor-driven electric compressor is directly proportional to a difference between the PM load and a threshold load, the duration increasing with the difference.

20. The system of claim 18, wherein the vehicle is an autonomous vehicle and/or a hybrid vehicle and the PF is a heated PF, and during the operation of the motor-driven electric compressor, and wherein the controller includes further instructions to activate a heater coupled to the PF.

* * * * *